(12) United States Patent
Choo et al.

(10) Patent No.: US 11,920,715 B2
(45) Date of Patent: Mar. 5, 2024

(54) QUICK CONNECTOR WITH RETAINER AND VERIFIER

(71) Applicant: Hanil Tube Corporation, Incheon (KR)

(72) Inventors: Seong-hwa Choo, Incheon (KR); Jeong-ho Lim, Incheon (KR); Dong-hyeok Lee, Gyeonggi-do (KR)

(73) Assignee: HANIL TUBE CORPORATION, Incheon (KR)

( * ) Notice: Subject to any disclaimer, the term of this patent is extended or adjusted under 35 U.S.C. 154(b) by 0 days.

(21) Appl. No.: 17/692,980

(22) Filed: Mar. 11, 2022

(65) Prior Publication Data
US 2022/0299141 A1    Sep. 22, 2022

(51) Int. Cl.
*F16L 37/098*    (2006.01)

(52) U.S. Cl.
CPC ....... *F16L 37/0982* (2013.01); *F16L 2201/10* (2013.01)

(58) Field of Classification Search
CPC .................................................. F16L 2201/10
See application file for complete search history.

(56) References Cited

U.S. PATENT DOCUMENTS

| 4,993,755 A | * | 2/1991 | Johnston | ............... | F16L 37/133 |
| | | | | | 285/422 |
| 6,536,807 B1 | | 3/2003 | Raymond et al. | | |
| 2014/0197629 A1 | * | 7/2014 | Barthel | ............... | F16L 37/0841 |
| | | | | | 285/93 |

FOREIGN PATENT DOCUMENTS

| DE | 19822574 C1 | 10/1999 |
| DE | 202020101638 U1 | 6/2020 |
| DE | 202020103903 U1 | 8/2020 |
| DE | 10126205 C1 | 4/2022 |
| EP | 2754941 A2 | 7/2014 |
| JP | H03121396 A | 5/1991 |
| JP | 200251557 A | 5/2002 |
| JP | S53-038021 | 10/2012 |
| WO | 2020179421 A1 | 9/2020 |

* cited by examiner

*Primary Examiner* — Aaron M Dunwoody
(74) *Attorney, Agent, or Firm* — Dickinson Wright PLLC

(57) ABSTRACT

A coupling assembly includes a female quick connector and a male member, wherein the male member has a latching element, a sealing section and a tip, wherein the sealing section is disposed between the latching element and the tip. The quick connector includes a retainer having at least one retaining element. The male member is in a latching position if the latching element is latched onto the at least one retaining element. The quick connector includes a verifier which is axially movable along a verification path, wherein the verification path comprises at least one locking position and at least one releasing position. The verifier in the locking position limits a movement of a section of the retainer in radial direction, so that the retainer is not actuatable in the locking position but actuatable in the releasing position of the verifier.

17 Claims, 14 Drawing Sheets

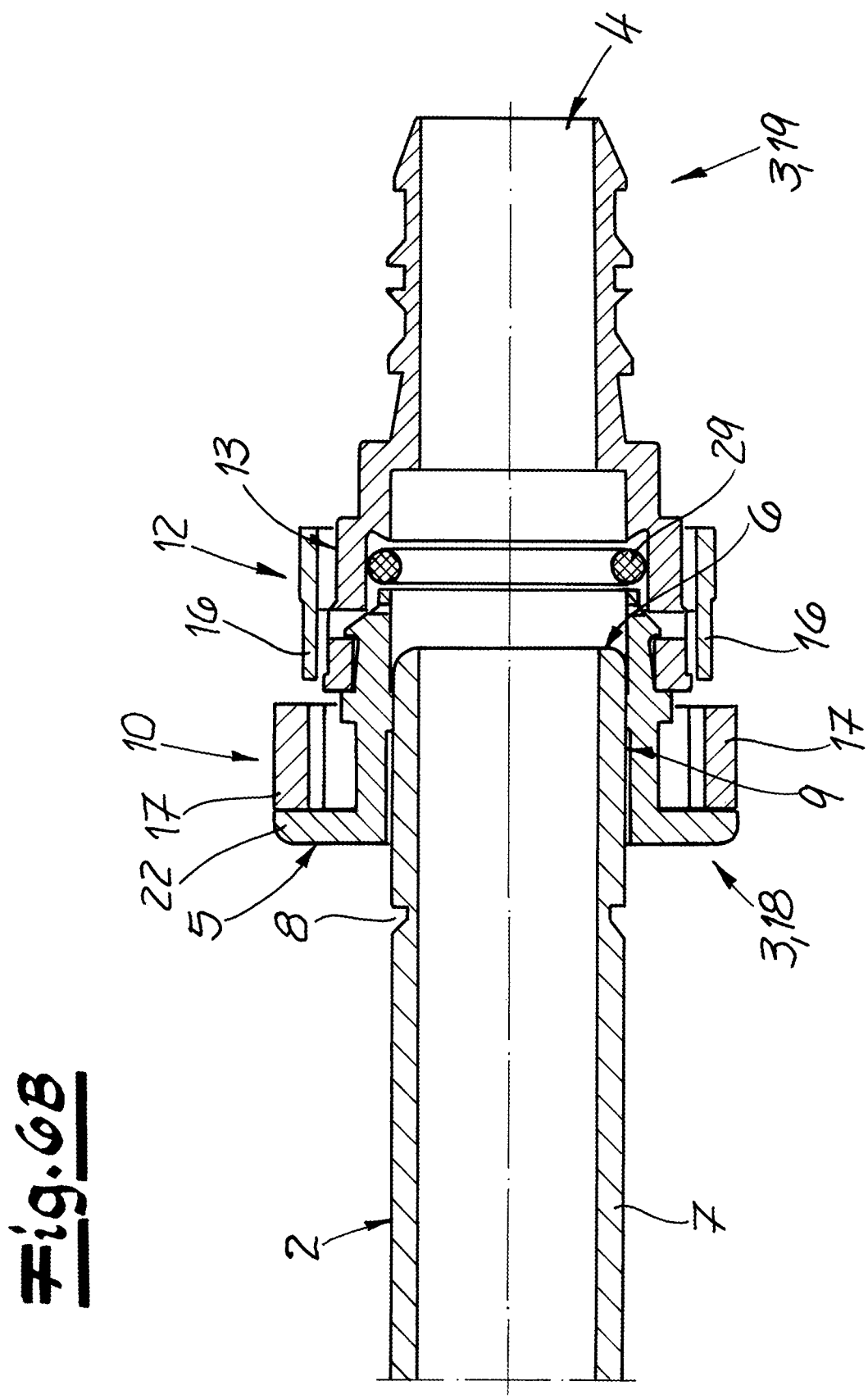

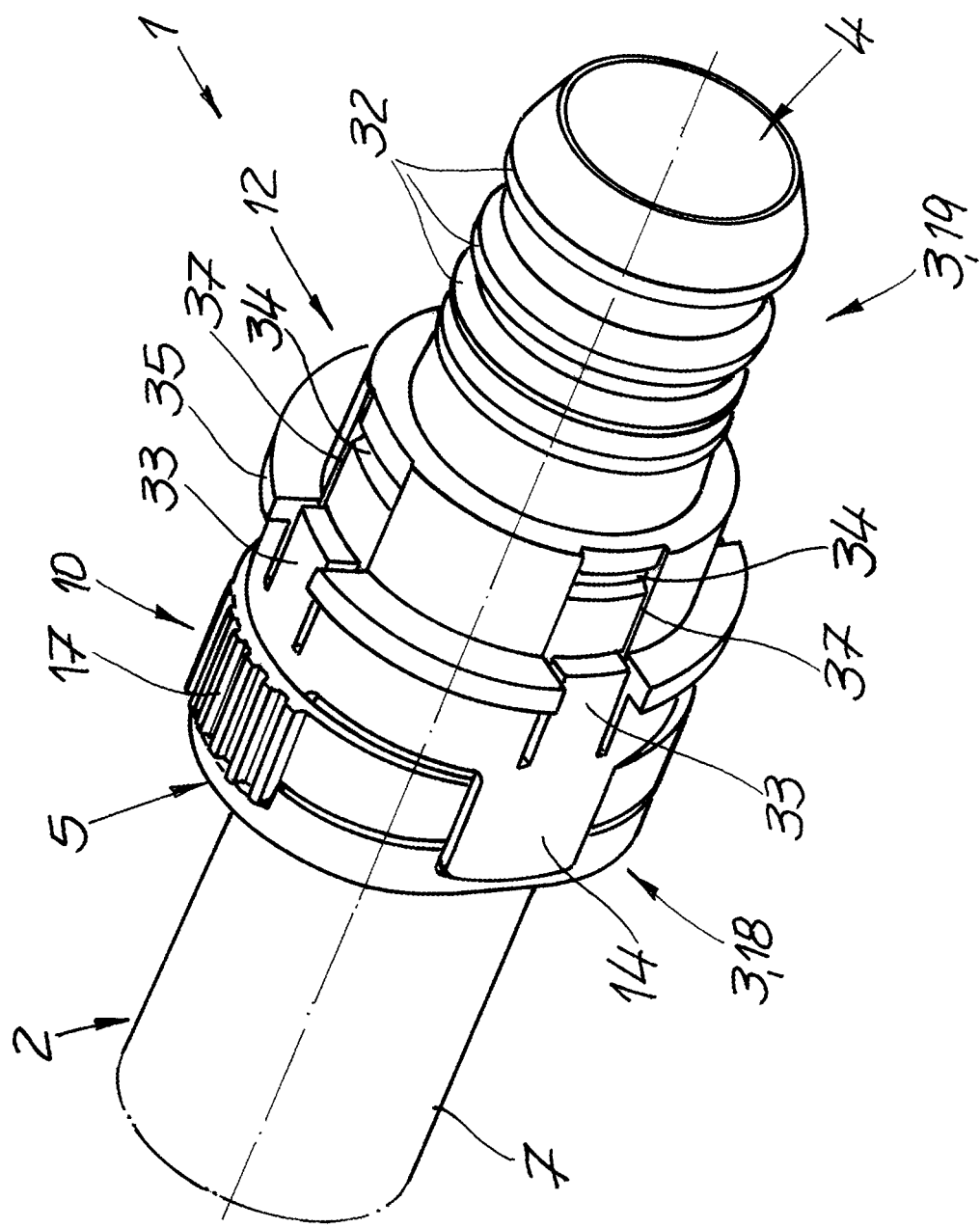

QUICK CONNECTOR WITH RETAINER AND VERIFIER

RELATED APPLICATIONS

The present disclosure is a national phase application of European Application 21163357.3, filed on Mar. 18, 2021, the entire contents of which is incorporated herein by reference.

FIELD

The disclosure refers to a coupling assembly comprising a female quick connector and a male member for insertion into the quick connector, wherein the male member has a tip for insertion into the main body, a wall defining an inner surface and an outer surface, and a latching element on the outer surface of the wall, wherein the male member comprises a sealing section between the latching element and the tip, wherein the quick connector comprises a retainer, wherein the retainer has at least one retaining element for interacting with the latching element of the male member for retaining the male member within the main body, wherein the retainer comprises at least one actuating segment, wherein the male member is in a latching position when the latching element is latched onto the at least one retaining element, wherein the male member is in a pre-latching position when the retaining element overlaps axially with the sealing section of the male member, wherein the quick connector has a verifier, wherein the verifier is axially movable along a verification path, wherein the verification path comprises at least one locking position and at least one releasing position, wherein the verifier in axial direction is closer to the retainer in the locking position than in the releasing position. The disclosure also refers to a method for establishing a fluid connection comprising such a coupling assembly.

BACKGROUND

One coupling assembly is known from DE 198 22 574 C1. This coupling assembly comprises a female quick connector, a complementary male member, an annular retainer and a verifier. The quick connector has two sealing rings for fluid tight sealing of a sealing section of the male member. The male member further comprises a latching element and a tip, wherein the sealing section is arranged between the tip and the latching element. The retainer has two retaining elements and two actuating segments. Both retaining elements are opposing each other. The same applies to both actuating segments, wherein imaginary connection lines of the actuating segments and the retaining elements form a cross in a front view. When the actuating segments are actuated, the retainer is flattened, thereby increasing the distance of the retaining elements and releasing the latching element and the male member, respectively, from a latching position.

The verifier of DE 198 22 574 C1 defines a locking position and a releasing position, wherein the retainer is actuatable in the releasing position and not actuatable in the locking position of the verifier. These two positions are part of a verification path of the verifier in which the verifier is axially moved from the axially outward releasing position to the axially inward locking position. The verifier covers the actuating segments of the retainer in the locking position thereby inhibiting actuation of the retainer. When the male member is fully inserted and thus latched onto the retaining elements of the retainer, the latching element engages with an inner element of the verifier so that the verifier is pushed out of the quick connector in axial outward direction. This state of the verifier thus defines a releasing position.

When the retainer is actuated and the male member is pulled out, the verifier can be pushed into the quick connector again. A latching mechanism within the quick connector holds the verifier in the locking position until the male member is fully inserted and the verifier is thrown out again. Hence, the verifier of DE 198 22 574 C1 verifies by being thrown out that the male member is fully inserted. However, we have discovered that comparable coupling assemblies might fail in certain situations in which the male member accidentally has been released from the quick connector resulting in fluid loss.

DE 101 26 205 C1 teaches a coupling assembly comprising a female quick connector, an according male member, an annular retainer and an annular verifier. In DE 198 22 574 C1 the verifier engages with the latching element of the male member in such a way that the latching element takes the verifier along the verification path until the latching element passes the retaining elements of the retainer. The male member then has reached its latching position while the verifier covers the actuating segments of the retainer which can be seen as a kind of a locking position of the verifier.

When the verifier of DE 101 26 205 C1 is moved from the releasing position to the locking position, a metal spring between the verifier and the quick connector is pressed thereby storing kinetic energy. The verifier comprises flexible actuating tabs covering the actuating segments of the retainer in the locking position. When the actuating tabs of the verifier are pushed radially inward, the actuating tabs in turn push the actuating segments of the retainer radially inward thereby releasing the male member. This then releases the stored kinetic energy of the spring so that the verifier and the male member are pushed axially outward. However, the force in order to actuate the actuating tabs of DE 101 26 205 C1 is practically the same like the one to actuate the actuating segments of DE 198 22 574 C1 since both are designed for the same power of human hands. This means that the same problem arises—high fluid pressures and/or material deterioration and/or improper handling of the coupling assembly might lead to a force which releases the latching element.

BRIEF SUMMARY

It is therefore an object of the disclosure to provide a quick connector with a noticeable increased connection safety. It is another object of the disclosure that the coupling assembly/the quick connector becomes more compact.

A coupling assembly provides a compact connection and increased connection safety, and comprises a female quick connector and a male member for insertion into the quick connector, wherein the quick connector comprises a main body, wherein the main body has a coupling section for insertion of the male member into the main body, wherein the main body comprises a hose section for connection with a hose or pipe, wherein the coupling section is connected to the hose section via a through bore of the main body, wherein the main body comprises a face end which is allocated to the coupling section, and wherein the male member has a tip for insertion into the main body. Also included is a wall defining an inner surface and an outer surface, and a latching element on the outer surface of the wall, wherein the male member comprises a sealing section between the latching element and the tip, wherein the male member has a longitudinal axis which defines an axial, a radial and a circumferential direction of the coupling assembly and the coupling section, respectively. The quick connector also comprises a retainer, wherein the retainer has at least one retaining element for interacting with the latching element of the male member for retaining the male member within the main body, wherein the retainer comprises at least one actuating segment for actuating the retainer for unlatching the latching element and releasing the male member from the main body, wherein the male member is in a latching position when the latching element is latched on to the at least one retaining element, wherein the male member is in a pre-latching position when the retaining element overlaps axially with the sealing section of the male member. The quick connector also has a verifier, wherein the verifier is axially movable along a verification path, wherein the verification path comprises at least one locking position and at least one releasing position, wherein the verifier in axial direction is closer to the retainer in the locking position than in the releasing position, wherein the verifier is kept by the coupling assembly in the locking position when the male member is in the latching position, wherein the coupling assembly is constructed so that the verifier in the locking position limits a movement of a section of the retainer in radial direction, so that the retainer is not actuatable in the locking position of the verifier but actuatable in the releasing position of the verifier.

The disclosure is initially based on the discovery that, over the lifetime of a vehicle, situations may occur in which high fluid pressures and/or material deterioration and/or improper handling of the coupling assembly lead to a force which releases the latching element. For example, very high fluid pressures may accidentally arise in fluid lines which press the male member axially outward against the retainer. This in turn can result in a high force onto deteriorated retaining elements which are spread apart thereby releasing the male member and causing fatal fluid loss.

DE 198 22 574 C1 does not teach to keep the verifier in the locking position by the coupling assembly when the male member is in the latching position. Instead, the verifier is thrown out of the main body when the male member reaches the latching position. If the coupling assembly of DE 198 22 574 would be constructed in such a way that the verifier is kept by the coupling assembly in the locking position when the male member is in the latching position, the verifier would lose its verification function. DE 101 26 205 C1 does not describe that the retainer is not actuatable in the locking position of the verifier. It is rather disclosed that the retainer must be actuatable in the locking position of the verifier since otherwise the verifier and thus the male member cannot be released anymore.

It was found that when the male member is in the latching position while the verifier is kept by the coupling assembly in the locking position so that the retainer is not actuatable, a double lock function occurs. This means that accidentally high forces have to work against the retainer and the verifier which significantly increases the force threshold to release the male member. Accidentally, forces now must be much higher making it nearly impossible to release the male member so that said object is solved.

Preferably the male member is in a released position where the male member does not overlap axially with the retaining element/the retaining elements. Preferably, the coupling assembly is in a decoupled state when the male member is in the released position. The coupling assembly is preferentially in a pre-coupled state when the male member is in the pre-latching position. It is preferred that the coupling assembly is in a latched state when the male member is in the latching position while the verifier is in the releasing position. According to a preferable embodiment, the coupling assembly is in a coupled state if the male member is in the latching position while the verifier is in the locking position. It is advantageous that the retainer is constructed so that the retainer acts like a spring when the actuating element/the actuating elements are pressed. The retainer preferentially is in a tensioned state while the actuating element/the actuating elements is/are pressed. Preferably, the retainer is in a relaxed state when the actuating element/the actuating elements is/are not pressed.

The term "actuatable" means that the retainer/the verifier can be manipulated manually by fingers of a human hand. The same applies to the word "movable". The quick connector might be straight or angled. If the quick connector is angled, a direction of the longitudinal axis of the hose section is different to the direction of the longitudinal axis of the coupling section. If the quick connector is angled, the longitudinal axis of the male member corresponds to the longitudinal axis of the coupling section but not to the longitudinal axis of the hose section.

It is preferable that the retainer has an annular shape. This effects that the retainer has more elastic stability compared to, for example, to a U-shaped retainer which contributes to a higher connection safety. The annular shape also promotes a smaller probability of a loss of the retainer. If the retainer has an annular shape, the retainer might be easier to actuate. It is preferred that the retainer comprises at least two actuating segments. Preferentially, the retainer has at least two retaining elements. The at least one retaining element preferably protrudes radially inward for engaging with the latching element of the male member. It is preferred that the at least one retaining element comprises a sloped surface facing axially outward for easier insertion of the male member.

Preferably, the retaining elements oppose each other with respect to the annular shape of the retainer. It is advantageous that the actuating segments oppose each other with respect to the annular shape of the retainer. It is preferred that, along the circumferential direction of the retainer, the retaining elements and the actuating segments are disposed in an alternating manner on the retainer. Preferably, a first imaginary line connects the retaining elements, while a second imaginary line connects the actuating segments. According to one preferred embodiment, the first and second imaginary lines form a cross in a front view of the retainer. Advantageously, said two imaginary lines enclose an angle of 70° to 110° and preferably of 80° to 100° between each other in a front view. The retainer preferentially comprises four ring sections. It is preferred that each ring section connects a retaining element with an actuating segment.

According to a preferable embodiment, the retainer comprises at least one covered section and preferentially two covered sections. The at least one covered section is preferably arranged radially outward of the at least one retaining element. It is preferred that a covered section is allocated to each retaining element. The at least one covered section may form an outer surface of the retainer. Preferably, the at least one covered section is designed to be covered by a/the according covering section of the verifier when the verifier is in the locking position.

The verifier advantageously may have an annular shape. If the verifier has an annular shape compared to, for example, a U-shaped verifier, the verifier can be constructed more rigid which makes the verifier capable of withstanding higher forces. Accordingly, the verifier provides a stronger locking function and thus a higher connection safety. It is preferred that the verifier comprises at least one and preferably two covering sections and/or at least one and preferably two intermediate segments. It is preferred that the at least one covering section and/or the at least one intermediate segment extends and preferably protrudes in axial direction and in particular in axially outward direction. The axial length of the at least one axially protruding covering section/intermediate segment is at least a fourth, preferably a third and most preferably a half of the axial length of the verifier.

Preferentially, the covering sections and the intermediate segments are arranged on the verifier in an alternating manner in circumferential direction. It is preferred that the two covering sections/the two intermediate segments oppose each other with respect to the annular shape of the verifier. The covering sections may be connected with a third imaginary line while the intermediate segments may be connected with a fourth imaginary line. Preferably, the third imaginary line and the fourth imaginary line form a cross in a front view of the verifier. It is preferred that the third imaginary line and the fourth imaginary line enclose an angle of 70° to 110° and preferably 80° to 100° between each other. According to an advantageous embodiment, the verifier comprises four annular segments. It is preferred that each annular segment connects a covering section with an intermediate segment.

Preferentially, the verifier is constructed so that the verifier is stiff in a radial direction and preferably in all radial directions. According to a particular embodiment, the annular segments each comprise a base rib and a strengthening rib, for making the verifier stiff.

The verifier may comprise at least one snapping element, preferably two or four snapping elements, for snapping onto the retainer and/or onto the main body in the locking position and/or in the releasing position. The main body preferably has at least one rear snapping item, preferentially two or four rear snapping items, corresponding to the at least one snapping element of the verifier. It is preferred that the at least one rear snapping item, for example a groove, defines a particular/the releasing position of the verifier in which the verifier is snapped onto the main body. According to a preferred embodiment, the main body comprises at least one front snapping item, preferably at least two or four front snapping items, corresponding to the at least one snapping element of the verifier. It is advantageous that the at least one front snapping item, for example a groove, defines a particular/the locking position of the verifier in which the verifier is snapped onto the main body.

According to another embodiment, the retainer comprises at least one front snapping item, preferably at least two or four front snapping items, corresponding to the at least one snapping element of the verifier. It is possible that the at least one front snapping item of the retainer, for example a groove, defines a particular/the locking position of the verifier in which the verifier is snapped onto the retainer.

It is preferred that the verifier comprises an operating element for moving the verifier in axial direction. The operating element can be a corrugated section of the outer surface of the verifier, a bead and/or a flange protruding in radially outward direction for better grip. The main body/the hose part preferably comprises at least one axial guide and in particular two or four axial guides for guiding the verifier along the verification path. The at least one axial guide advantageously prohibits a rotational movement of the verifier along the verification path/when the verifier is in the releasing position. The at least one axial guide may be a groove.

Preferentially, the coupling assembly is constructed so that the verifier—during a movement from the releasing position to the locking position—moves away from the hose section (axially outward). This provides a more compact quick connector in axial direction. It is preferred that the retainer is arranged in axial direction between the face end of the main body and the verifier in the locking position. The retainer preferably does not comprise the face end of the main body and the quick connector, respectively. The term "axially outward" advantageously means that the verifier in the releasing position and the face end of the main body are arranged in the same axial half of the quick connector so that the axially outward movement is not directed to the axial middle of the quick connector.

It is preferred that the coupling assembly is constructed so that the verifier in the locking position, and preferably also in the releasing position, is not actuatable in radial direction. If the verifier is not actuatable in radial direction in the locking position, the probability of an accidental manual release is much smaller. This also applies with respect to accidental high fluid pressures. The effect of this feature is thus a stronger locking function which increases connection safety. Preferentially, the verifier is stiff so that human fingers cannot deform the verifier in radial direction. It is possible that the main body/the retainer supports the verifier in the locking position so that human fingers cannot deform the verifier in radial direction.

According to a preferred embodiment, the coupling assembly is constructed so that the verifier can be moved to the locking position when the male member is in the latching position, wherein the verifier cannot be moved to the locking position when the male member is in the pre-latching position. This provides a haptic verification of the latching position of the male member and thus increases the connection safety. It is preferred that the coupling assembly is constructed so that the verifier can be moved to the locking position when the male member is in the released position. Preferably, the verifier abuts on the retainer in axial direction before reaching the locking position when the male member is in the pre-latching position. The verifier preferentially does not abut on the retainer in axial direction during a movement from the releasing position to the locking position when the male member is in the latching position.

Preferably, the retainer is a separate element with respect to the main body and the face end, respectively. This effects a higher flexibility of the retainer so that in particular no long axial webs for flexibility are needed which provides a more compact coupling section and thus a more compact quick connector. According to an advantageous embodiment, the retainer is a separate element with respect to the coupling part and the quick connector, respectively. The term "separate" preferably means that there is no bonding or integral connection between the retainer and the coupling part/the main body/the quick connector/the face end.

According to a preferred embodiment, the latching element of the male member is a groove. This provides a more compact male member in radial direction and thus a more compact quick connector. It is preferred that the inner surface of the wall of the male member at the tip is cylindrical. The groove preferably comprises an axial outer wall and an axial inner wall. Preferentially, the axial inner wall of the male member is sloped in a longitudinal section of the male member. Preferably, at least a section of the axial outer wall of the groove member extends in radial direction for latching onto the retaining element/the retaining elements of the retainer.

It is advantageous that the sealing section of the male member has a length L in the axial direction, wherein the sealing section has an outer diameter D, wherein the ratio of L to D is at the most 2.2, preferably at the most 1.9 and most preferably at the most 1.6. This provides a more compact male member in axial direction and thus a more compact quick connector in axial direction.

It is preferable that the quick connector/the main body comprises an optical verification element, wherein it is preferred that the optical verification element is visible/readable when the verifier is in one of both the locking position and the releasing position, while the optical verification element is not visible/readable when the verifier is in the other one of both the locking position and the releasing position. This effects a visual indication of the latching position of the male member and thus increases connection safety. The coupling assembly is preferably constructed so that the optical verification element is covered by the verifier when the verifier is in one of both the releasing position and the locking position. Advantageously, the optical verification element is not covered by the verifier when the verifier is in the other one of both the locking position and the releasing position. It is preferred that the optical verification element is visible/readable when the verifier is in the locking position. Preferentially, the optical verification element is not visible/readable when the verifier is in the releasing position.

It is preferred that the optical verification element is machine-readable. The optical verification element can be a QR-code or a barcode. According to a preferred embodiment, the optical verification element is fixed/printed on an outer surface of the main body/the coupling part/the hose part/the retainer.

It is preferred that the coupling assembly is constructed so that the verifier in the locking position restricts a movement of a section of the retainer in a radial inward direction and/or restricts a movement of a section of the retainer in a radial outward direction. This provides the double lock or even the triple lock function of the coupling assembly and thus increases connection safety. It is preferred that the at least one actuating segment of the verifier abuts on the at least one intermediate segment of the verifier when the verifier is in the locking position and when the actuating segment/the actuating segments are pressed. Advantageously, the at least one covered section of the retainer abuts in radial direction, preferably in radially outward direction, on the at least one covering section when the verifier is in the locking position and when the at least one actuating segment is pressed.

Preferentially, the coupling assembly is constructed to that the verifier has at least one covering section which covers a covered section of the retainer in radial direction when the verifier is in the locking position. This effects a locking function of the verifier and thus increases connection safety. It is preferred that the coupling assembly is constructed so that the covering section does not cover the covered section of the retainer in radial direction when the verifier is in the releasing position. In particular, at least two sections/the two covering sections of the verifier may cover according sections/the covered sections of the retainer when the verifier is in the locking position.

According to an advantageous embodiment, the coupling assembly is constructed so that the verifier has at least one intermediate segment which is positioned in radial direction between the at least one actuating segment of the retainer and the main body/the male member when the verifier is in the locking position. This provides a locking function of the verifier and increases connection safety. It is preferred that the intermediate segment is not disposed between the actuating segment and the main body/the male member when the verifier is in the releasing position. It is advantageous that at least two segments/the two intermediate segments of the verifier are each disposed between according sections/the two actuating segments when the verifier is in the locking position.

Preferably, the main body comprises a coupling part and a hose part, wherein the coupling part is fixed to the hose part, preferably in a form-fitting and/or force-fitting manner and/or by material bonding. This effects that the main body can receive an annular shaped retainer so that the retainer is hold captively on the main body. This also contributes to the compactness of the quick connector. Preferably, the coupling part comprises the face end. It is preferred that the hose part comprises the hose section. It is preferred that the coupling part and the hose part are connected by a snap connection. The coupling part may comprise an axial connection section which preferably comprises at least one connection element and preferably at least two connection elements. The hose part may have an axial connection segment which preferably comprises at least one connection piece and preferably at least two connection pieces for engaging with the connection element/the connection elements of the coupling part. It is preferred that the coupling part has four connection elements while the hose part comprises four corresponding connection pieces.

The quick connector/the main body/the hose part preferably encompasses a sealing element in radial direction. The sealing element can be a sealing ring which may comprise an elastomer. It is preferred that the coupling part and the hose part enclose the sealing element in axial direction. Preferentially, the coupling part encloses the retainer in axial direction. The sealing element preferably engages with the sealing section of the male member. The material bonding can be achieved by gluing and in particular welding (laser welding or friction welding).

It is preferred that the coupling assembly is constructed so that the verifier does not contact the male member during insertion of the male member into the quick connector and the main body, respectively. This simplifies the structure of the verifier/retainer/main body/coupling assembly and thus provides more compactness. In particular, the coupling assembly can be constructed so that the verifier is not expanded in radial direction during the whole insertion process of the male member into the main body. It is preferred that the male member in the pre-latching position deforms/expands the retainer in radial direction and in particular moves the retaining element/spreads the retaining elements apart from each other. The radial expansion of the retainer in the pre-latching position of the male member preferably results in that the verifier abuts on the retainer in axial direction before the verifier reaches the locking position. It is preferred that the retainer is deformed by the male member in the pre-latching position so that the verifier cannot be moved to the locking position.

The above-mentioned object is solved by a method for establishing a fluid connection method for establishing a fluid connection comprising a coupling assembly having a female quick connector and a male member for insertion into the quick connector, in particular comprising a coupling assembly according to the disclosure, wherein the quick connector comprises a main body, wherein the main body has a coupling section for insertion of the male member into the main body, wherein the main body comprises a hose section for connection with a hose or pipe, wherein the coupling section is connected to the hose section via a through bore of the main body, wherein the main body comprises a face end which is allocated to the coupling section, wherein the male member has a tip for insertion into the main body, a wall defining an inner surface and an outer surface, and a latching element on the outer surface of the wall, wherein the male member comprises a sealing section between the latching element and the tip, wherein the male member has a longitudinal axis which defines an axial, a radial and a circumferential direction of the coupling assembly and the coupling section, respectively, wherein the quick connector comprises a retainer, wherein the retainer has at least one retaining element for interacting with the latching element of the male member for retaining the male member within the main body, wherein the retainer comprises at least one actuating segment for actuating the retainer for unlatching the latching element and releasing the male member from the main body, wherein the male member is in a latching position when the latching element is latched onto the at least one retaining element, wherein the male member is in a pre-latching position when the retaining element overlaps axially with the sealing section of the male member, wherein the quick connector has a verifier, wherein the verifier is axially movable along a verification path, wherein the verification path comprises at least one locking position and at least one releasing position, wherein the verifier in axial direction is closer to the retainer in the locking position than in the releasing position, wherein the verifier is kept by the coupling assembly in the locking position when the male member is in the latching position, wherein the verifier in the locking position limits a movement of a section of the retainer in radial direction, so that the retainer is not actuatable in the locking position of the verifier but actuatable in the releasing position of the verifier.

BRIEF DESCRIPTION OF THE DRAWINGS

Two exemplary embodiments of the disclosure are explained in more detail below with reference to several schematic figures. It is shown in FIG. 1 is a perspective view of a first coupling assembly according to the disclosure, FIGS. 6A-6D are a second series of longitudinal sections of the coupling assembly in which the longitudinal sections have been rotated by 90° around the longitudinal axis compared to FIG. 5A-5D, FIG. 7 is a perspective view of a second coupling assembly according to the disclosure.

DETAILED DESCRIPTION

Figure 1:
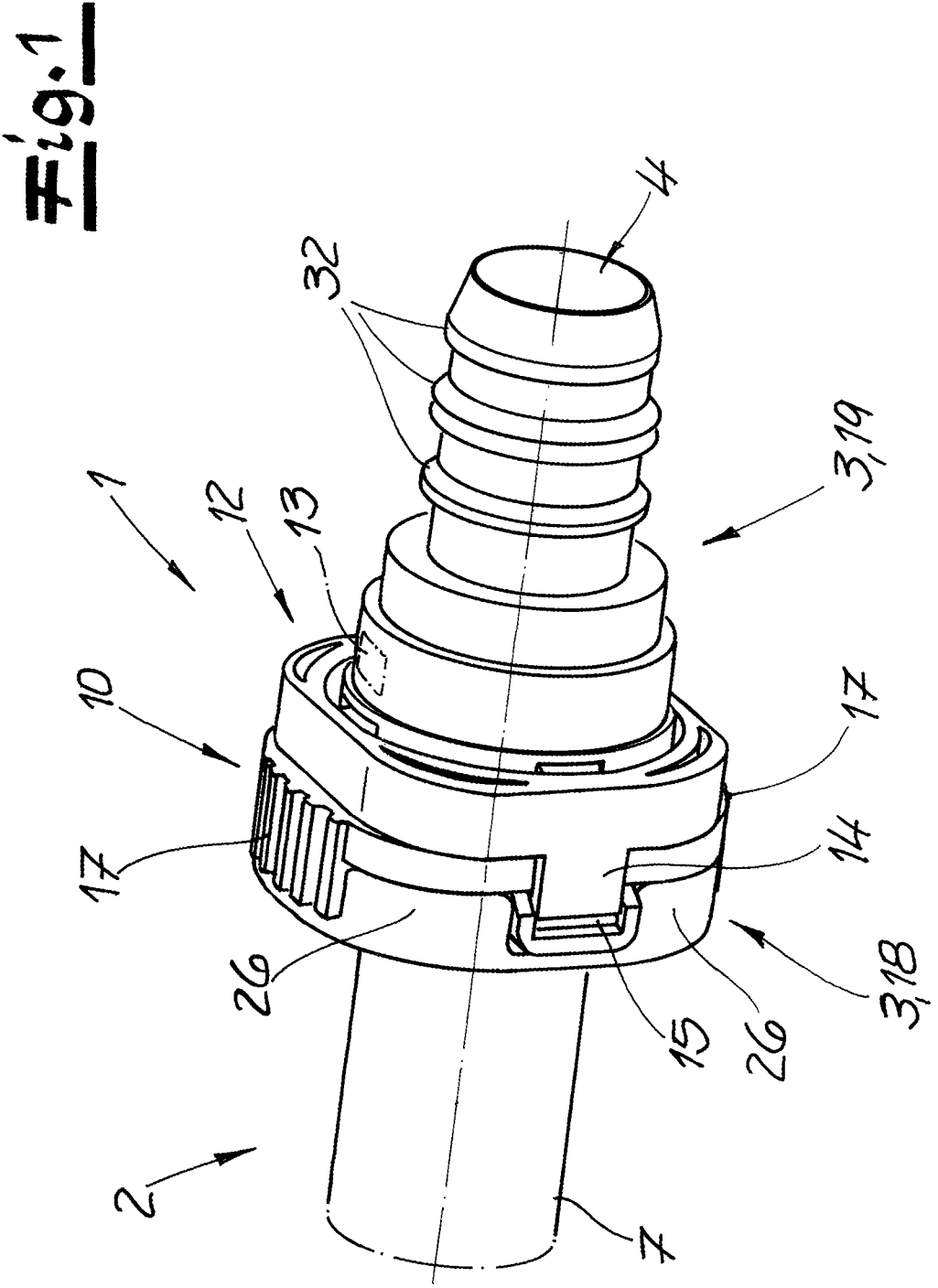

FIG. 1 highlights the basic components of a first coupling assembly according to the disclosure comprising a female quick connector 1 and a complementary male member 2. The quick connector of this embodiment comprises several separate parts and in particular a retainer 10 and a verifier 12 which both preferably surround at least in part a main body 3 of the quick connector 1. The main body 3 preferentially comprises a coupling part 18 and a hose part 19 which are advantageously snapped together via a snap connection which is explained in detail further below.

The main body 3 has a through bore 4 extending from the hose part 19 to the coupling part 18 thereby providing a fluid connection of the male member 2 with a first hose (not shown). The male member 2 may be an end piece of a second hose or of another component (both not shown) of a fluid line system which is not visualised as well. Said first hose can be connected with the hose part 19 in this embodiment by plugging it on barbed elements 32 of the hose part 19.

As can be seen in FIG. 1, it is preferred that the quick connector 1, the main body 3, and the hose part 19, respectively, comprises an optical verification element 13. The optical verification element 13 of this embodiment is a QR-code which is printed onto the hose part 19. The function of the optical verification element 13 is explained in more detail further below.

The retainer 10 is advantageously an annular part which surrounds in circumferential direction at least section wise the main body 3 and the male member 2, respectively. The retainer 10 preferably has two actuating segments 17 which are preferentially arranged diametrically with respect to each other. The actuating segments 17 of the retainer 10 of this embodiment are designed to be actuated by two fingers and therefore have corrugated surfaces for better grip. The retainer 10 may comprise two covered sections 15 (the second one is not visible in FIG. 1 due to the perspective) which preferably oppose each other diametrically. The function of these covered sections 15 is explained in more detail with respect to FIGS. 5A to 5D.

Still referring to FIG. 1, the verifier 12 preferably is an annular element which surrounds the main body 3. The verifier 12 of this embodiment has two locking sections 14 which are arranged diametrically with respect to each other, wherein the second locking section is not visible due to the perspective. Due to the coupled state of the coupling assembly in FIG. 1, the verifier 12 is in a locking position in which the locking sections 14 of the verifier 12 engage with the covered sections 15 of the retainer 10. The male member 2 is fully inserted into the main body 3 and the quick connector 1, respectively, which defines a latched position of the male member 2. Thus, the coupled state of the coupling assembly is characterized in that the verifier 12 is in the locking position while the male member 2 is in the latched position. Said positions and the according mechanisms are explained in detail in view of FIGS. 5A to 6D.

Figure 2:
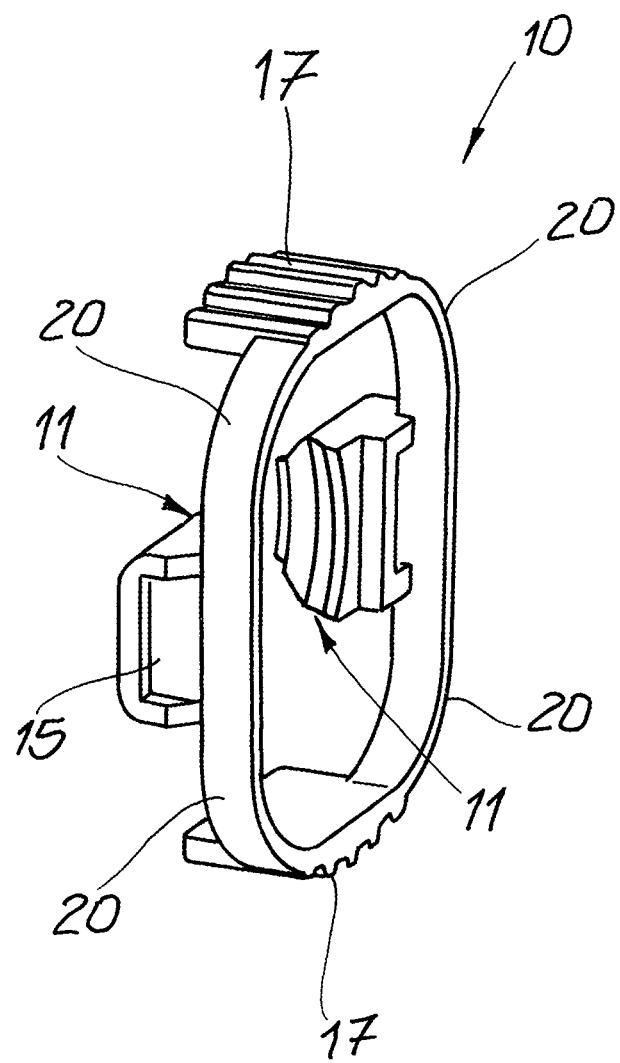
FIG. 2 is a perspective view of a retainer of the coupling assembly of FIG. 1.

FIG. 2 illustrates the structure of the retainer 10 and shows that the retainer 10 is basically annular shaped. In particular, ring sections 20 connect the covered sections 15 with the actuating segments 17 resulting in said annular shape of the retainer 10. Imaginary connection lines between the two covered sections 15 on the one hand and between the two actuating segments 17 on the other hand may form a cross. It is preferred that the angle between said two imaginary lines is 90°. The covered sections 15 of this embodiment each may correspond with a retaining element 11. Preferentially, the retaining elements 11 project radially inward for engagement with a latching element 8 of the male member 2 (see FIG. 5A). The retaining elements 11 both advantageously have sloped surfaces facing axially outward for easier insertion of the male member 2.

When the actuating segments 17 of the retainer 10 are pressed, both actuating segments 17 move radially inward. This preferably causes a radial movement of the retaining elements 11 in radial outward direction for disengaging with the latching element 8 of the male member 2, thereby characterizing a tensioned state of the retainer 10. When the actuating segments 17 are not pressed anymore, the retainer 10 preferentially acts like a spring so that the actuating segments 17 move radially outward. At the same time, the retaining elements 11 advantageously move radially inward, thereby defining a relaxed state of the retainer 10.

Figure 3:
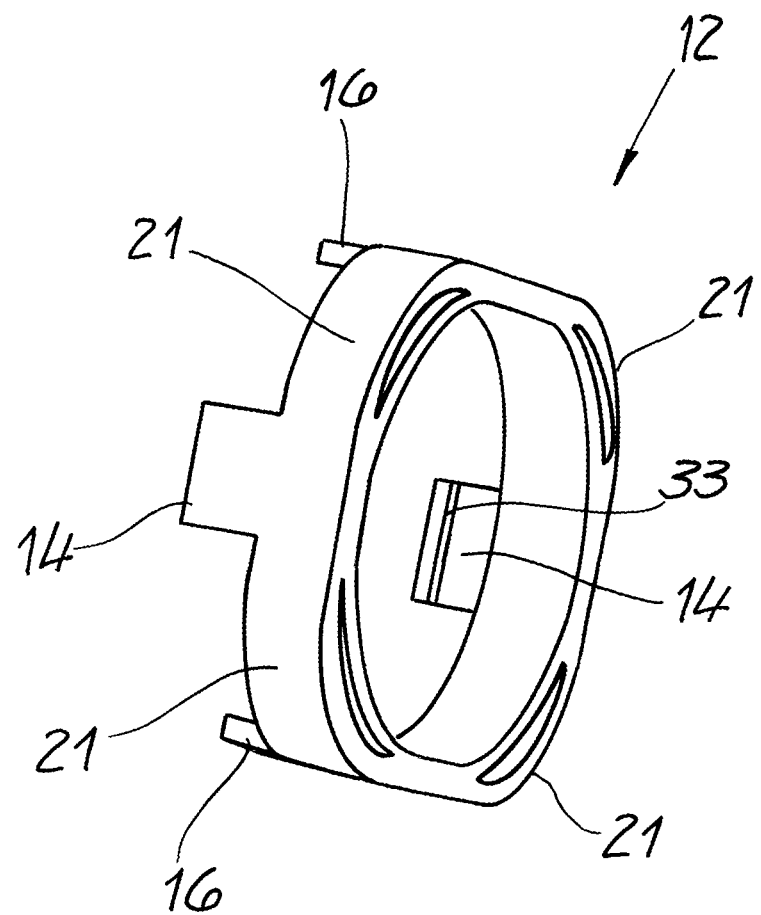
FIG. 3 is a perspective view of a verifier of the coupling assembly of FIG. 1.

The verifier 12 is shown in more detail in FIG. 3. In particular, the verifier 12 of this embodiment comprises two intermediate segments 16 which project in axial outward direction and which are not visible in FIG. 1 since the intermediate segments 16 are covered by the actuating segments 17 of the retainer 10. The two intermediate segments 16 are connected with a first imaginary line as well as both looking sections 14 are connected with each other by a second imaginary line. In this embodiment, both imaginary lines of the looking sections 14 and the intermediate segments 16 form a cross. It is preferred that said two imaginary lines of the verifier 12 form an angle of 90°. The verifier 12 further comprises in this embodiment four annular segments 21, wherein each annular segment 21 preferably connects a locking section 14 with an intermediate segment 16. In contrast to the ring sections 20 retainer 10, the annular segments 21 of the verifier are rather stiff which might be realized by thicker annular segments 21 and/or by strengthening ribs as shown in FIG. 3. The verifier 12 is basically moved in axial direction from a releasing position into a locking position which is explained in particular with respect to FIGS. 5 and 6.

Figure 4:
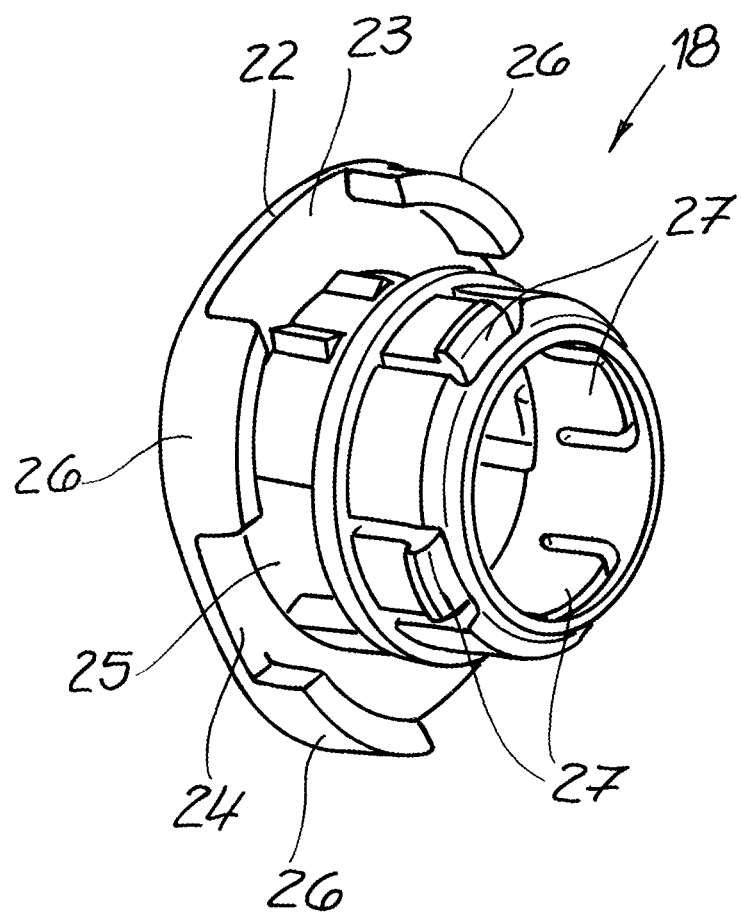
FIG. 4 is a perspective view of a coupling part of the coupling assembly of FIG. 1, FIGS. 5A-5D are a series of longitudinal sections of the coupling assembly of FIG. 1 at different points of the insertion procedure of a male member.

FIG. 4 shows a perspective view of the coupling part 18 of the main body 3. The coupling part 18 advantageously has a connection section extending in axial direction which preferably comprises several connection elements 27. Said connection elements 27 preferentially engage with according connection pieces 28 (see FIG. 5A) of a connection section of the hose part 19. The connection elements 27 and the connection pieces 28 preferably form a snap connection in order to assemble the main body 3. The coupling part 18 further may comprise a flange 22 having a face end 5 (see FIG. 5A) facing axially outward. The coupling part 18 preferably has annular coverings 26. Preferentially, the annular coverings 26 are connected with the flange 22 forming actuating recesses 23 and preferable retaining recesses 24. While the actuating recesses 23 of this embodiment each may receive an actuating segment 17 of the retainer 10, the retaining recesses 24 preferably each receive a covered section 15 of the retainer 10 (compare with FIG. 1). It is preferred that the coupling part 18 further comprises two retaining slots 25 which are arranged diametrically with respect to each other (the second retaining slot 25 is not visible due to the perspective of FIG. 4) and which are preferably designed to each receive a retaining element 11 of the retainer 10. It is preferred that the coupling part 18 comprises a latching section extending in axial direction. Preferentially, the latching section is disposed between the snap section and the flange 22, respectively.

Figure 5A:
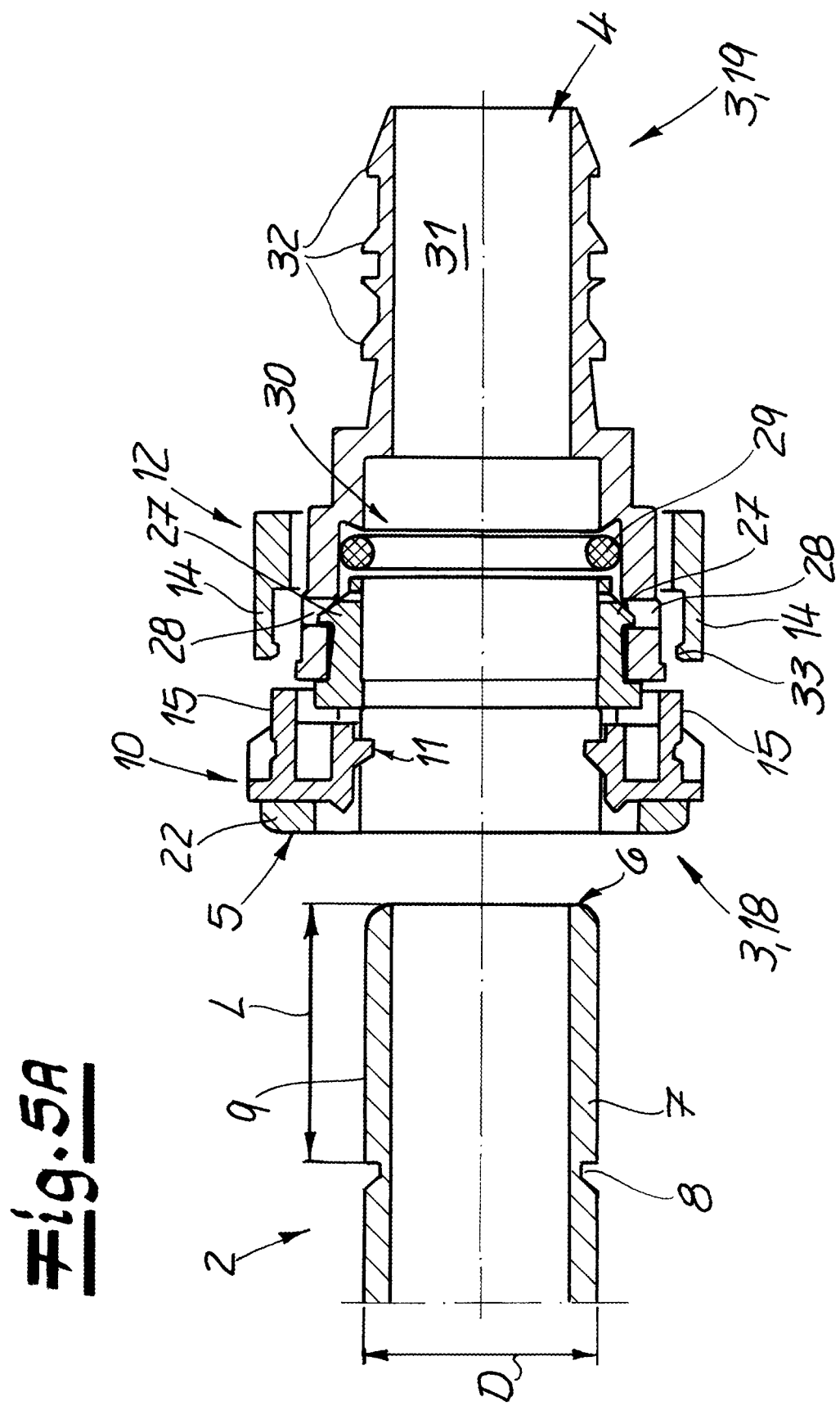
Figure 5B:
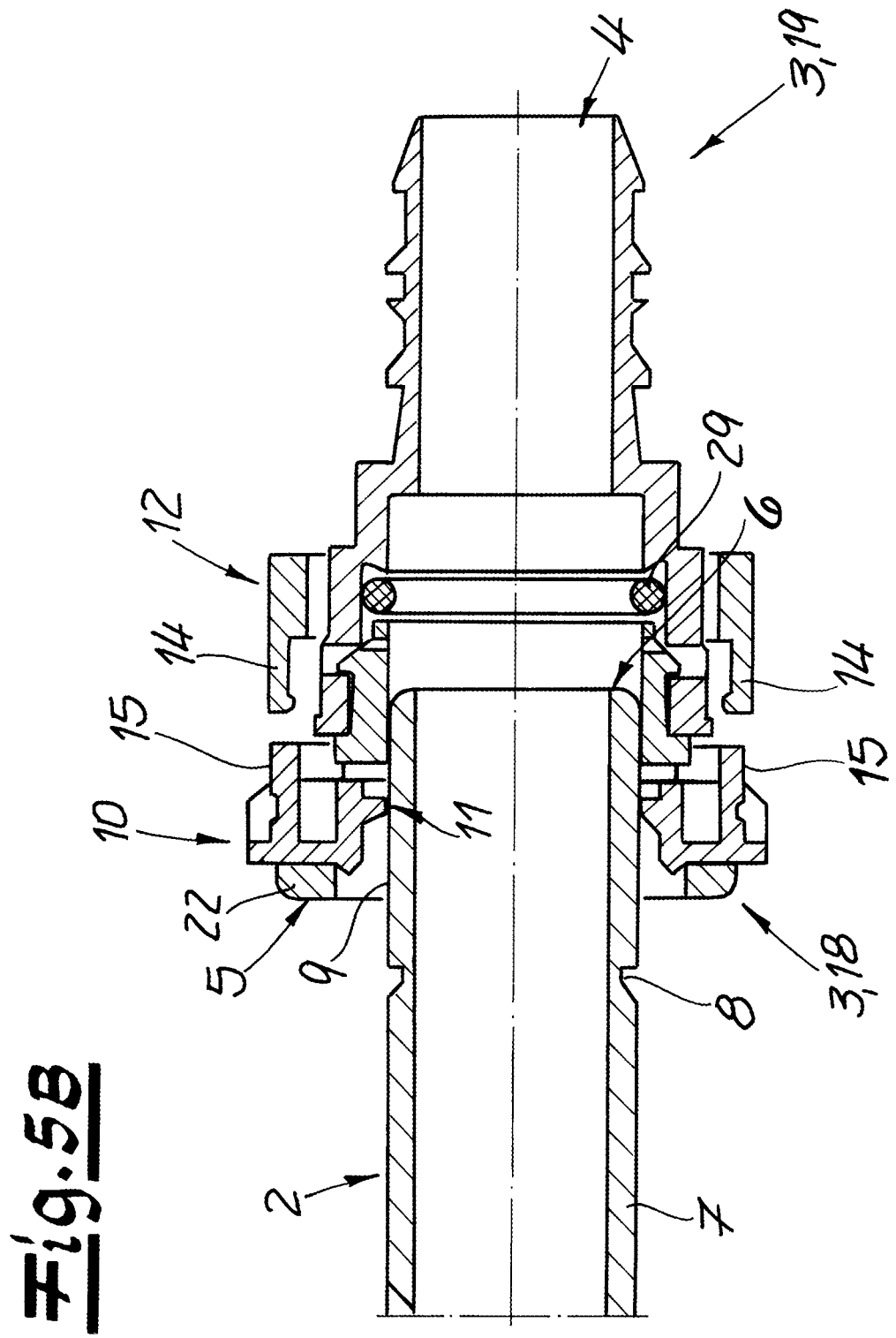
Figure 5C:
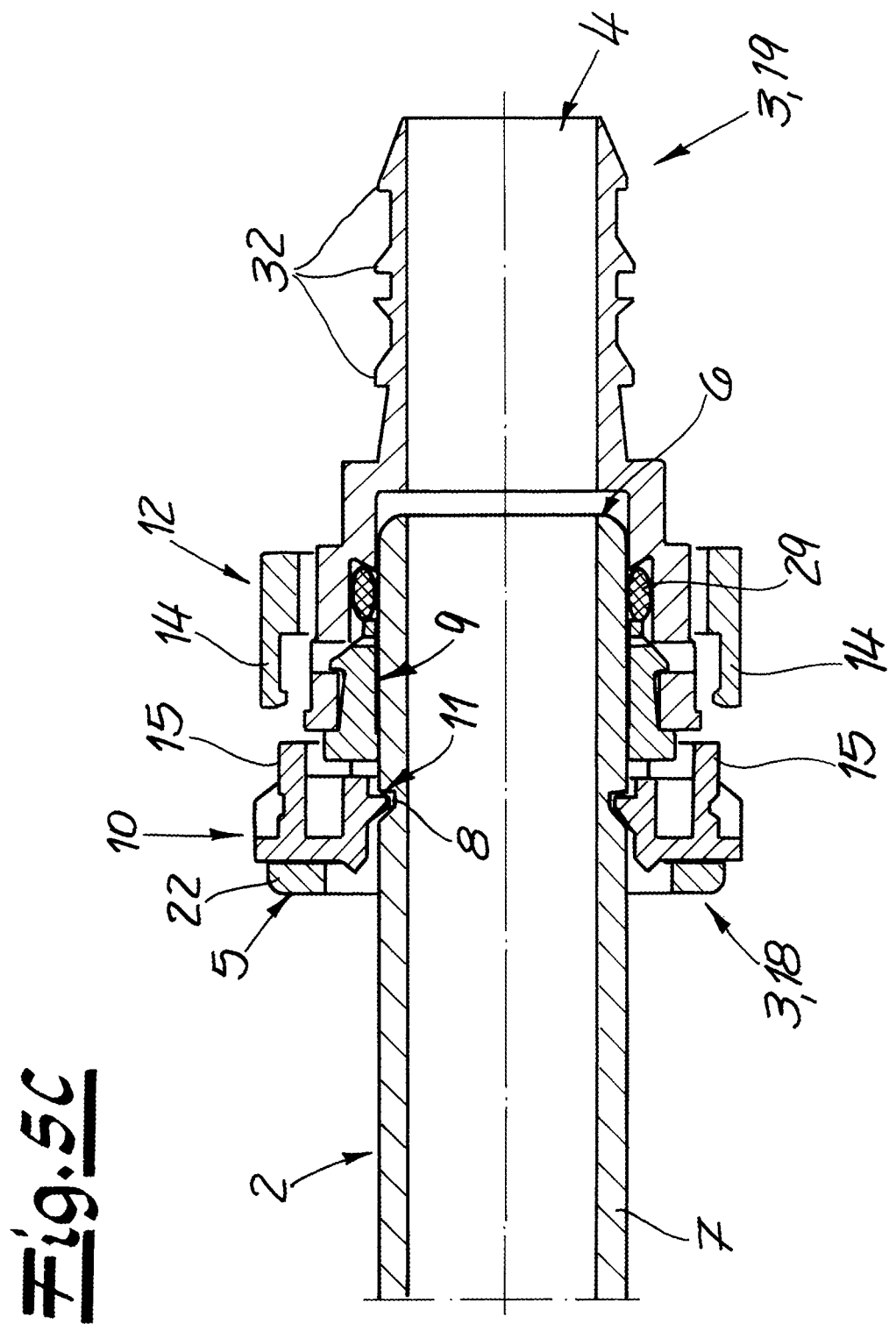
Figure 5D:
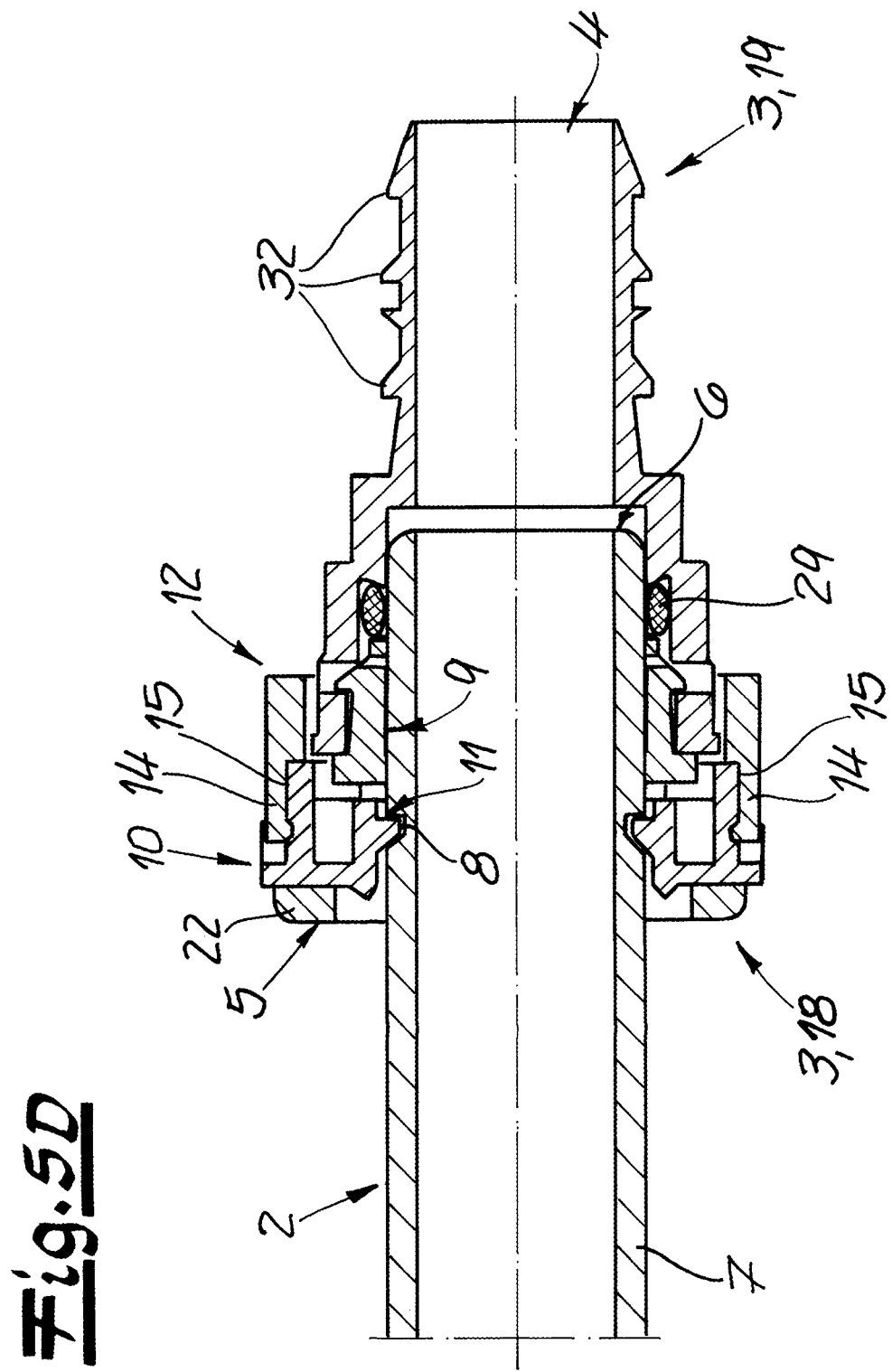
Figure 6A:
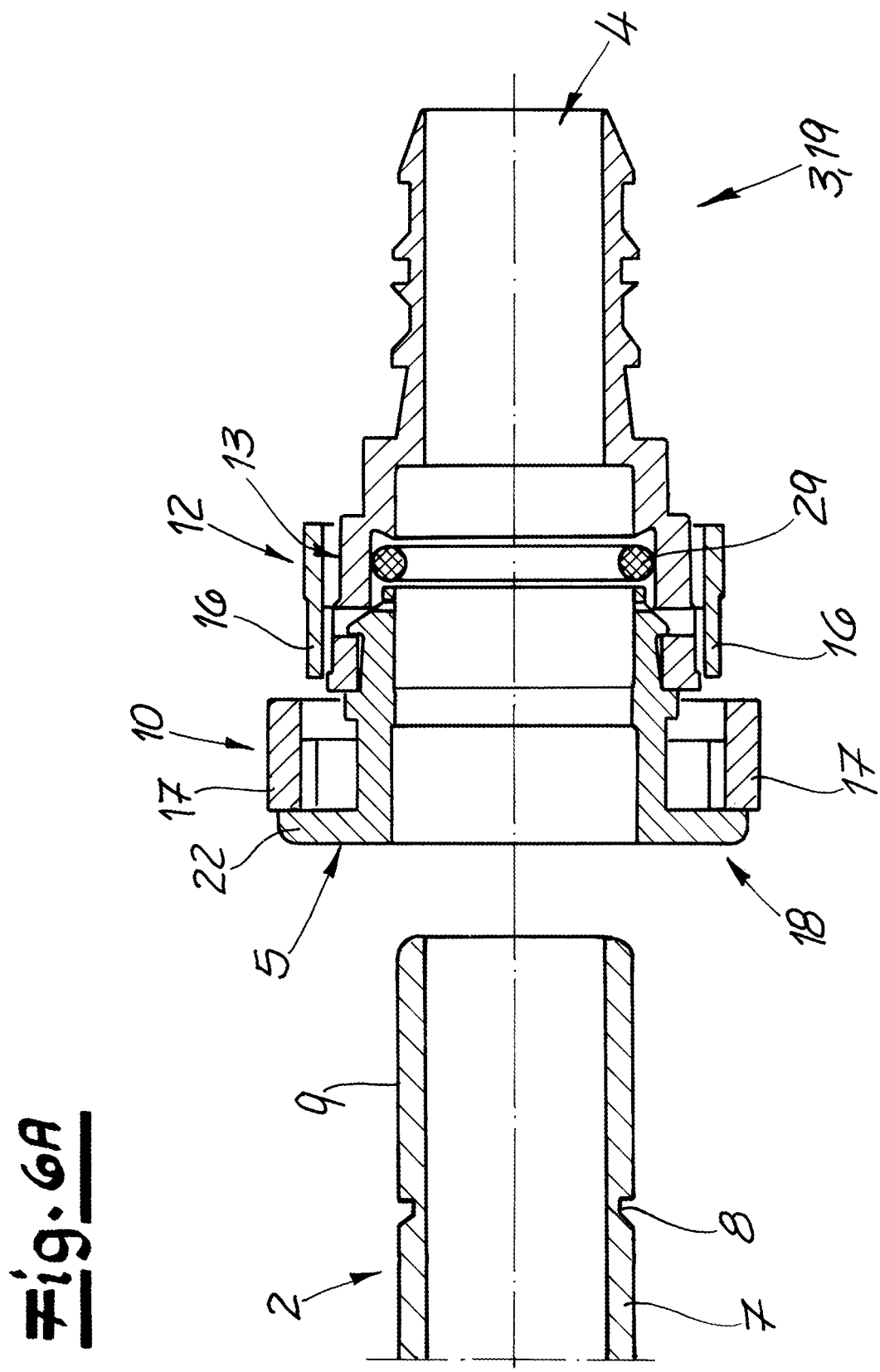
Figure 6C:
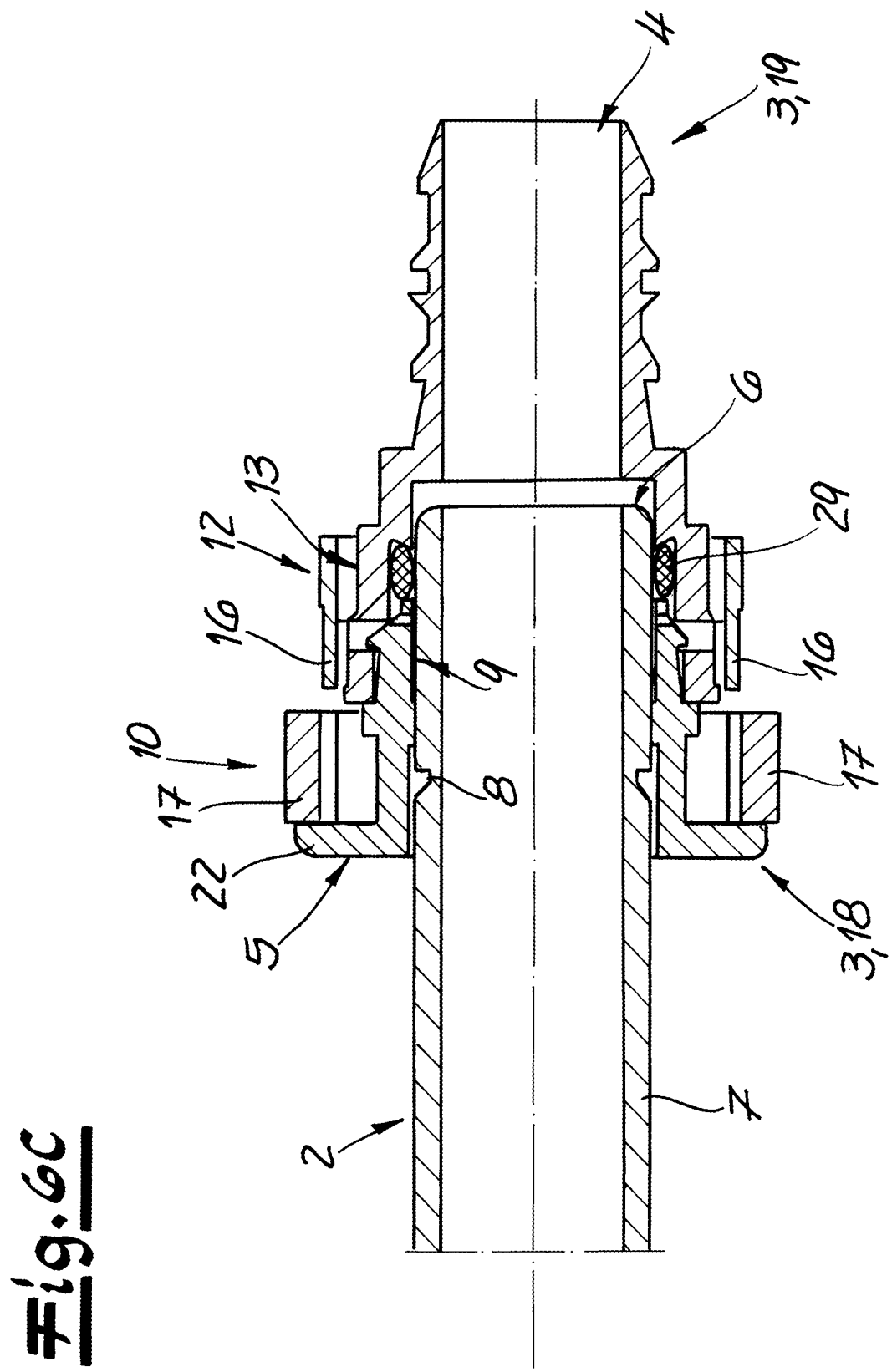
Figure 6D:
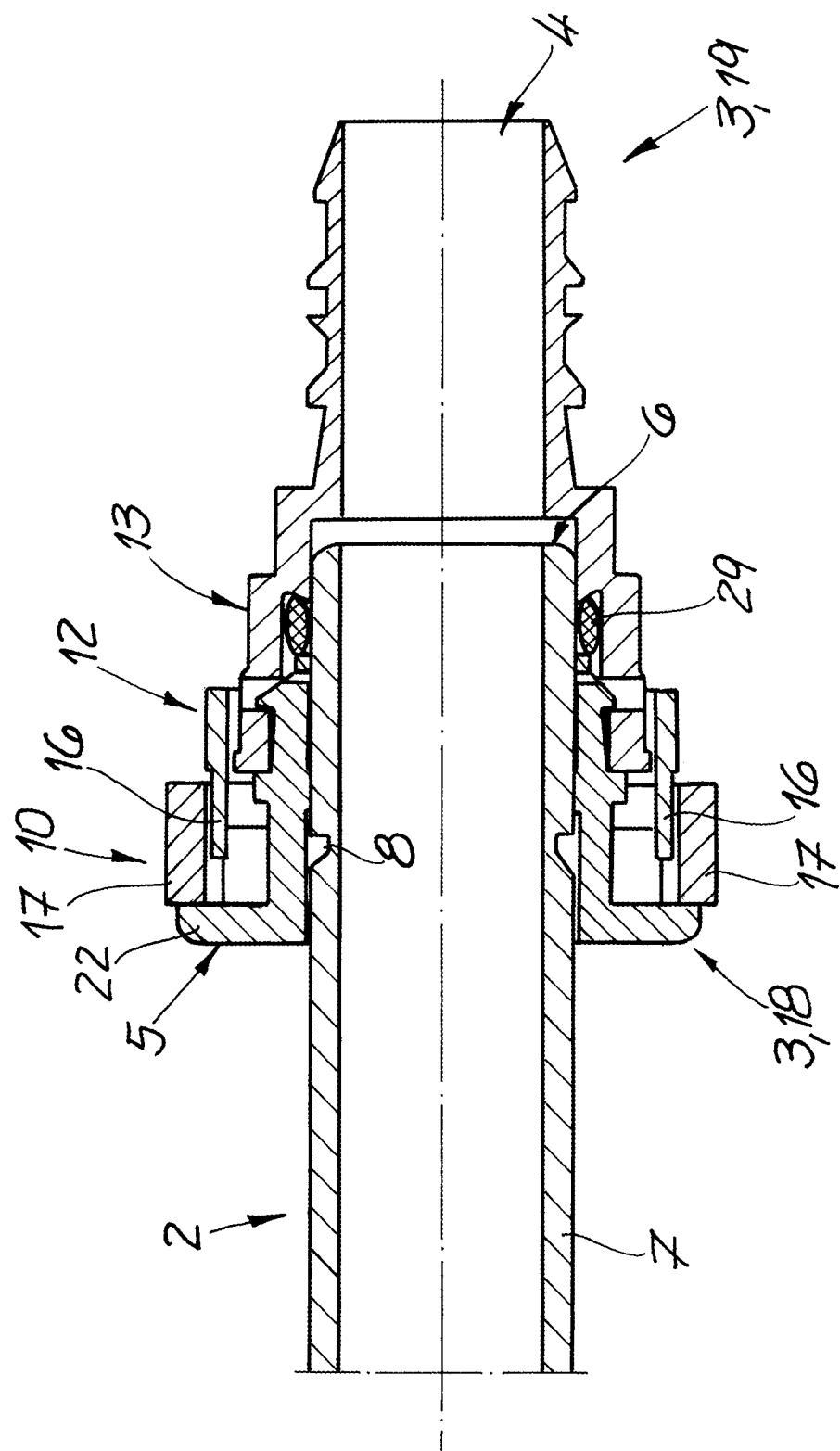

The coupling mechanism of the coupling assembly is shown in two series of FIGS. 5A to 5D and 6A to 6D. Both series show different points of an insertion procedure of the male member 2 into the quick connector 1. In particular FIGS. 5A and 6A visualize an open position of the male member 2 in which the male member 2 is not yet inserted into the quick connector 1 so that the coupling assembly is in a decoupled state. FIGS. 5B and 6B show a pre-latching position of the male member 2, while the male member 2 is in a latched position in FIGS. 5C and 6C. FIGS. 5D and 6D highlight a locking position of the verifier 12 in contrary to a releasing position of the verifier 12 in FIGS. 5A to 5C and 6A to 6C. The figure series 5A to 5D shows longitudinal sections through the locking sections 14 and the covered sections 15, while FIGS. 6A to 6D illustrate longitudinal sections through the intermediate segments 16 and the actuating segments 17.

FIG. 5A shows an assembled state of the main body 3 and thus an engagement of the snapping elements 27 of the coupling part 18 with the snapping pieces 28 of the hose part 19. The snapping elements of this embodiment are shaped as radially flexible hooks which are hooked into said snapping pieces 28. The snapping pieces 28 are preferably window-shaped. The main body 3/the hose part 19 has a hose section which is designed for engagement with a hose (not shown). For example, the hose section of the main body 3/the hose part 19 may have barbed elements 32, wherein the hose section defines a hose chamber 31. The male member 2 of FIG. 5A has not yet been inserted into the quick connector 1 so that the male member 2 is in the open position and that the coupling assembly is in the decoupled state. The male member 2 has a wall 7 and a, preferably rounded, tip 6. The male member 2 further comprises a latching element 8 which is formed as a groove in this embodiment. A sealing section 9 has an axial length L and is disposed between the latching element 8 and the tip 6. The sealing section 9 is designed for fluid tight engagement with a sealing element 29 within a sealing chamber 30 of the main body 3 and the coupling part 19, respectively. In particular, the male member 2 has an outer diameter D preferably corresponding to an inner diameter of the sealing element 29 which is an elastomeric sealing ring in this embodiment. It is preferred that the inner diameter of the hose chamber 31 corresponds to the inner diameter of the male member 2.

It has to be noted that the retainer 10 of FIG. 5A is in a relaxed state, wherein the verifier 12 is in a releasing position. The verifier 12 of this embodiment is latched onto the main body 3 in the releasing position via two rear snapping items (not shown) on the outer surface of the main body 3/the hose part 19. It is preferred that the locking sections 14 of the verifier 12 do not cover the covered sections 15 of the retainer 10 in the releasing position. Since the locking sections 14 have a radial position which is slightly radially outward compared to the radial position of the covered sections 15, it is in general possible to move the verifier 12 in axial outward direction along a verification path and thus toward the face end 5 so that the locking sections 14 would overlap the covered sections 15, thereby defining the locking position of the verifier 12. This however is not done during the subsequent described insertion procedure of the male member 2 since the locking position of the verifier 12 disables the flexibility of the retainer 10 in radial direction so that the male member 2 could not be inserted into the quick connector 1 anymore.

The tip 6 of FIG. 5B has passed the retaining elements 11 (but not yet the sealing element 29), thereby pushing them radially outward and defining a pre-latching position of the male member 2. Accordingly, the covered sections 15 are also moved radially outward so that the covered sections 15 now substantially have the same radial position like the locking sections 14. This in turn means that the verifier 12 is not movable along the verification path in axially outward direction anymore since the locking sections 14 would abut on the covered sections 15 in axial direction. While the retainer 10 of FIG. 5B now is in a tensioned state, the verifier 12 is still in the releasing position and cannot be moved into the locking position. Thus, the pre-latching position of the male member 2 is indicated by the verifier 12 in that the verifier 12 cannot be shifted into the locking position.

FIG. 5C depicts a situation in which the male member 2 has been fully inserted so that the tip 6 has passed the sealing element 29. Also, the latching element 8 has reached the retaining elements 11 of the retainer 10. As a consequence, the retainer 10 changed its state from the tensioned state into the relaxed state by snapping onto the latching element 8 of the male member 2. Since the covered sections 15 moved radially inward, they do not block any more the verification path, so that the verifier 12 can be moved by a user along the verification path from the releasing position of FIG. 5C into the locking position of FIG. 5D. The verifier 12 of this embodiment comprises two snapping elements 33 for latching onto the retainer 10 via two according front snapping items 36 of the retainer 10 in the form of two grooves. It has to be noted that—while the male member 2 is inserted into the quick connector—the verifier 12 can only be moved along the verification path when the male member 2 has latched with the retaining elements 11.

FIG. 6A shows the situation of the coupling assembly of FIG. 5A, wherein the coupling assembly has been rotated by 90° around the longitudinal axis thereby showing the relation between the intermediate segments 16 of the verifier 12 and the actuating segments 17 of the retainer 10. In the decoupled state of the coupling assembly of FIG. 6A, the actuating segments 17 are positioned slightly radially outward compared to the intermediate segments 16. This means that the verifier 12 in general could be moved axially outward since the actuating segments 17 do not block the intermediate segments 16.

According to FIG. 6B, the male member 2 is partly inserted into the quick connector 1 until the tip 6 has passed the retaining elements 11 (not shown in FIG. 6B due to the rotation of the perspective) but not yet the sealing element 29. Here, the male member 2 is in the pre-latching position. As already described with respect to FIG. 5B, the retaining elements 11 are pushed radially outward which in turn means that the actuating segments 17 of the retainer 10 are pulled radially inward as shown in FIG. 6B. Now, the actuating segments 17 abut on the intermediate segments 16 when the verifier 12 is moved axially outward. This means that also the actuating segments 17 block the verifier 12 in axial direction when the male member 2 is in the pre-latching position.

FIG. 6C shows the fully inserted male member 2 so that the latching element 8 reached the retaining elements 11 (compare with FIG. 5C). Since the retaining elements 11 snapped in radially inward direction, the actuating segments 17 have been pushed radially outward. Hence, the actuating segments 17 do not block anymore the intermediate segments 16 and the verifier 12, respectively.

The optical verification element 13 is still covered by the verifier 12 in FIG. 6C. But when the verifier 12 is moved from the releasing position of FIG. 6C to the locking position of FIG. 6D, the optical verification element 13 becomes visible. The visible optical verification element 13 of FIG. 6D is a clear indication that the male member 2 is fully inserted. Also the actuating segments 17 cannot be actuated anymore since they are blocked in radially inward direction by the intermediate segments 16 and since the locking sections 14 of the verifier block the covered sections 15 of the retainer 10 in radial outward direction (FIG. 5D).

Thus, this embodiment indicates in a clear haptic and visual manner when the male member 2 is in the latching position. The verifier 12 and the optical verification element 13 also indicate when the male member 2 is only in the pre-latching position. Two locking mechanisms of the verifier 12 lock the retainer 10 in the latching position of the male member 2 so that neither external forces can press the actuating segments 17 radially inward nor internal forces the retaining elements 11 radially outward. These two locking mechanisms support the latching mechanism of the retainer 10 resulting in a triple lock coupling assembly making it for accidentally forces nearly; —possible to release the male member 2. Instead, a user first has to move the verifier 12 axially outward along the verification path to the releasing position in order to then press the actuating segments 17 for releasing the male member 2.

FIG. 7 depicts a second embodiment of the disclosure and thus a second coupling assembly comprising a quick connector 1 and a male member 2. The quick connector 1 of this second embodiment comprises a main body 3, a retainer 10, and a verifier 12. The main body 3 of the second embodiment has a coupling part 18 and a hose part 19 which are assembled together via a snap connection comparable to the one of the first embodiment.

While the retainer 10 of the second embodiment is more or less the same like the retainer 10 of the first embodiment, the verifier 12 of the second embodiment differs compared to the first embodiment. In particular, the verifier 12 of the second embodiment preferably comprises an operating element 35 which can be a bead or flange protruding in radial direction for better grip in order to move the verifier 12 along the verification path. The verifier 12 of the second embodiment comprises at least one snapping element 33 and preferably four snapping elements 33 which are preferably located in an axially rear section of the verifier 12. The main body 3/the hose part 19 of the second embodiment may comprise at least one and preferably four rear snapping items 34 which correspond to the snapping elements 33 of the verifier 12 when the verifier 12 is in the releasing position. The main body 3/the hose part 19 of this embodiment comprises four axial guides 37 in the form of grooves in axial direction.

Figure 8:
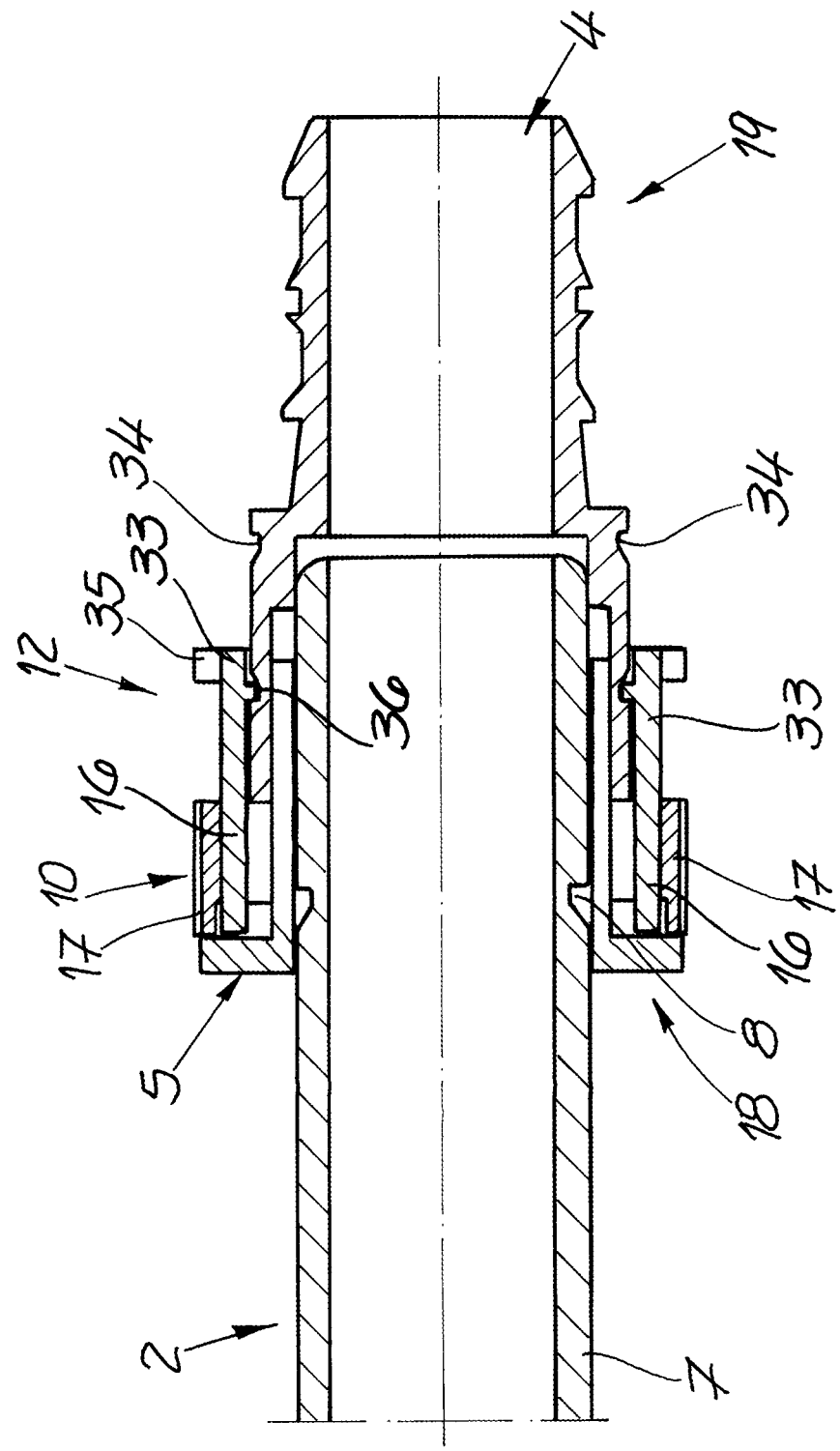
FIG. 8 is a longitudinal section of the second coupling assembly of FIG. 7.

FIG. 8 shows a longitudinal section of the second embodiment in which the male member 2 is in the latched position (retaining elements not visible in this longitudinal section comparable to FIG. 6D), while the verifier 12 is in the locking position so that the coupling assembly is in the coupled state. In particular, the intermediate segments 16 of the verifier are disposed in radial direction between the actuating segment 17 of the retainer 10 and the hose part 19. FIG. 8 highlights that the snapping elements 33 preferably comprise a protrusion which protrudes in radially inward direction. The main body 3/the hose part 19 of this embodiment comprises at least one and preferably four front snapping items 36 which correspond with the snapping elements 33 when the verifier 12 is in the locking position. Likewise, the rear snapping items 34 engage with the snapping elements 33 when the verifier 12 is in the releasing position. It is preferred that the rear snapping items 34, the front snapping items 36 and the snapping elements 33 define the releasing position and the locking position, respectively. The protrusions of the snapping elements 33 of this embodiment also engage with the axial guides 37 so that the verifier 12 cannot be rotated along the verification path and in particular not when the verifier 12 is in the releasing position.

| List of reference numerals: | |
|---|---|
| 1 | quick connector |
| 2 | male member |
| 3 | main body |
| 4 | through bore |
| 5 | face end |
| 6 | tip |
| 7 | wall |
| 8 | latching element |
| 9 | sealing section |
| 10 | retainer |
| 11 | retaining element |
| 12 | verifier |
| 13 | optical verification element |
| 14 | covering section |
| 15 | covered section |
| 16 | intermediate segment |
| 17 | actuating segment |
| 18 | coupling part |
| 19 | hose part |
| 20 | ring section |
| 21 | annular segment |
| 22 | flange |
| 23 | actuating recess |
| 24 | retaining recess |
| 25 | retaining slot |
| 26 | annular covering |
| 27 | connection element |
| 28 | connection piece |
| 29 | sealing element |
| 30 | sealing chamber |
| 31 | hose chamber |
| 32 | barbed element |
| 33 | snapping element |
| 34 | rear snapping item |
| 35 | operating element |
| 36 | front snapping item |
| 37 | axial guide |

The invention claimed is:

1. A coupling assembly, comprising:
a female quick connector and a male member for insertion into the quick connector, wherein the quick connector includes a main body, wherein the main body has a coupling section for insertion of the male member into the main body, wherein the main body includes a hose section for connection with a hose or pipe, wherein the coupling section is connected to the hose section via a through bore of the main body, wherein the main body includes a face end which is allocated to the coupling section;
wherein the male member has a tip for insertion into the main body, a wall defining an inner surface and an outer surface, and a latching element on the outer surface of the wall, wherein the male member includes a sealing section between the latching element and the tip, wherein the male member has a longitudinal axis which defines an axial, a radial and a circumferential direction of the coupling assembly and the coupling section, respectively;
wherein the quick connector includes a retainer, wherein the retainer has at least one retaining element for interacting with the latching element of the male member for retaining the male member within the main body, wherein the retainer includes at least one actuating segment for actuating the retainer for unlatching the latching element and releasing the male member from the main body, wherein the male member is in a latching position when the latching element is latched onto the at least one retaining element, wherein the male member is in a pre-latching position when the retaining element overlaps axially with the sealing section of the male member;
wherein the quick connector includes a verifier, wherein the verifier is axially movable along a verification path, wherein the verification path comprises at least one locking position and at least one releasing position, wherein the verifier in axial direction is closer to the retainer in the locking position than in the releasing position, wherein the verifier is kept by the coupling assembly in the locking position when the male member is in the latching position, and wherein the verifier in the locking position limits a movement of a section of the retainer in radial direction, so that the retainer is not actuatable in the locking position of the verifier but actuatable in the releasing position of the verifier;
wherein the retainer is annular and the at least one retaining element is circumferentially spaced from the at least one actuating segment such that, in the pre-latching position, the at least one retaining element moves radially outwardly and causes the at least one actuating segment to move radially inwardly into a position that blocks rearward movement of the verifier.

2. The coupling assembly according to claim 1, wherein the retainer and/or the verifier has an annular shape.

3. The coupling assembly according to claim 1, wherein the coupling assembly is constructed so that the verifier—during a movement from the releasing position to the locking position—moves away from the hose section.

4. The coupling assembly according to claim 1, wherein the coupling assembly is constructed so that the verifier in the locking position is not actuatable in radial direction.

5. The coupling assembly according to claim 1, wherein the coupling assembly is constructed so that the verifier can be moved to the locking position when the male member is in the latching position, wherein the verifier cannot be moved to the locking position when the male member is in the pre-latching position.

6. The coupling assembly according to claim 1, wherein the retainer is a separate element with respect to the main body and the face end, respectively.

7. The coupling assembly according to claim 1, wherein the latching element of the male member is a groove.

8. The coupling assembly according to claim 1, wherein the quick connector comprises an optical verification element, wherein the optical verification element is visible or readable when the verifier is in one or both of the locking position and the releasing position, while the optical verification element is not visible or readable when the verifier is in the other one of both the locking position and the releasing position.

9. The coupling assembly according to claim 8, wherein the optical verification element is a machine-readable bar code and/or a QR-code.

10. The coupling assembly according to claim 1, wherein the coupling assembly is constructed so that the verifier in the locking position restricts a movement of a section of the retainer in a radial inward direction and restricts a movement of a section of the retainer in a radial outward direction.

11. The coupling assembly according to claim 1, wherein the verifier has at least one covering section which covers a covered section of the retainer in radial direction when the verifier is in the locking position.

12. The coupling assembly according to claim 1, wherein the verifier has at least one intermediate segment which is positioned in radial direction between the at least one actuating segment of the retainer and the male member when the verifier is in the locking position.

13. The coupling assembly according to claim 1, wherein the main body comprises a coupling part and a hose part, wherein the coupling part is fixed to the hose part in a form-fitting and/or force-fitting manner or by material bonding.

14. The coupling assembly according to claim 1, wherein the verifier is constructed so that it does not contact the male member during insertion of the male member into the quick connector and the main body, respectively.

15. A method for establishing a fluid connection utilizing the coupling assembly according to claim 1, comprising:
   inserting the tip of the male member into the main body into the pre-latching position whereby the at least one retaining element moves radially outwardly and causes the at least one actuating segment to move radially inwardly into a position that blocks rearward movement of the verifier;
   moving the male member from the pre-latching position, where the retaining element overlaps axially with the sealing section of the male member, to the latching position where the latching element is latched onto the at least one retaining element such that the at least one actuating segment to move radially outwardly; and
   axially moving the verifier along the verification path from the at least one releasing position to at least one locking position, wherein the verifier in the axial direction is closer to the retainer in the locking position than in the releasing position, wherein the verifier is kept by the coupling assembly in the locking position when the male member is in the latching position, the verifier in the locking position limiting movement of the section of the retainer in radial direction so that the retainer is not actuatable in the locking position of the verifier but actuatable in the releasing position of the verifier.

16. The method of claim 15, further comprising the steps of:
   axially moving the verifier from the at least one locking position to the at least one releasing position; and
   actuating the at least one actuating segment of the retainer for unlatching the latching element and releasing the male member from the main body.

17. The coupling assembly according to claim 1, wherein the coupling assembly is constructed so that the verifier, in the releasing position, is not actuatable in radial direction.

* * * * *